(12) United States Patent
Chau et al.

(10) Patent No.: US 8,472,728 B1
(45) Date of Patent: Jun. 25, 2013

(54) SYSTEM AND METHOD FOR IDENTIFYING AND CHARACTERIZING CONTENT WITHIN ELECTRONIC FILES USING EXAMPLE SETS

(75) Inventors: Duc Chau, San Pedro, CA (US); David Williams, Malibu, CA (US)

(73) Assignee: The Rubicon Project, Inc., Los Angeles, CA (US)

( * ) Notice: Subject to any disclaimer, the term of this patent is extended or adjusted under 35 U.S.C. 154(b) by 585 days.

(21) Appl. No.: 12/610,156

(22) Filed: Oct. 30, 2009

Related U.S. Application Data (60) Provisional application No. 61/197,942, filed on Oct. 31, 2008.

(51) Int. Cl.
*G06K 9/70* (2006.01)
*G06K 9/62* (2006.01)

(52) U.S. Cl.
USPC .......................................... 382/226; 382/159

(58) Field of Classification Search
None
See application file for complete search history.

(56) References Cited

U.S. PATENT DOCUMENTS

| | | | |
|---|---|---|---|
| 6,757,571 B1 | 6/2004 | Toyama | |
| 6,763,148 B1 | 7/2004 | Sternberg et al. | |
| 6,892,193 B2 | 5/2005 | Bolle et al. | |
| 6,937,744 B1 | 8/2005 | Toyama | |
| 7,319,779 B1* | 1/2008 | Mummareddy et al. | 382/118 |
| 7,979,369 B2* | 7/2011 | Grenier et al. | 706/20 |
| 2005/0060295 A1* | 3/2005 | Gould et al. | 707/3 |
| 2006/0095521 A1* | 5/2006 | Patinkin | 709/206 |
| 2007/0250301 A1 | 10/2007 | Vaisberg et al. | |
| 2008/0040302 A1 | 2/2008 | Perrizo | |
| 2009/0220166 A1* | 9/2009 | Choi et al. | 382/260 |
| 2009/0274364 A1* | 11/2009 | Shakya et al. | 382/165 |

OTHER PUBLICATIONS

Wikipedia.org/wiki/Raster_image, "Raster Graphics," 2005, http://web.archive.org/web/20051103234902/http://en.wikipedia.org/wiki/Raster_image, pp. 1-3.*
Breiman, "Random Forests," 2001, Machine Learning, vol. 40. No. 1, pp. 1-35.*
Dietterich, "An Experimental Comparison of Three Methods for Constructing Ensembles of Decision Trees: Bagging, Boosting, and Randomization," 1999, Machine Learning, pp. 1-22.*
Wikipedia.org/wiki/Serialization, "Serialization," 2006, http://web.archive.org/web/20060913000000/http://en.wikipedia.org/wiki/Serialization, pp. 1-3.*
Liaw, "Classification and Regression by randomForest," 2002, R News, pp. 18-22.*
Volpi, "Linear Algebra for Big Matrices," 2003, Foxes Team, pp. 1-3.*
Leo Breiman, "Random Forests" [online], [Retrieved on Mar. 5, 2012]. Retrieved from the Internet: <URL: http://web.archive.org/web/20051103013443/http://oz.berkeley.edu/users/breiman/RandomForests/cc_home.htm>, pp. 1-21.*

* cited by examiner

*Primary Examiner* — Andrew W Johns
*Assistant Examiner* — David F Dunphy
(74) *Attorney, Agent, or Firm* — Dentons US LLP (57) ABSTRACT

A system and method for determining inappropriate content within images. A plurality of training images are used to teach the machine. The training images are converted into numerical data and stored along with its human judged label in a BigMatrix. Through the BigMatrix, a RandomForest is created to discern patterns among the training images and human-judged labels. To determine whether an image contains inappropriate content, the image is converted into numerical data. The numerical data is fed to the RandomForest generated from the plurality of training images and known content. The numerical data is fed down each tree within the RandomForest. When the numerical data is routed down through the branches of the trees and terminated at a leaf node, a vote for the leaf node is obtained. The overall response of the RandomForest is given by a majority rules vote for each tree within the RandomForest.

26 Claims, 8 Drawing Sheets

SYSTEM AND METHOD FOR IDENTIFYING AND CHARACTERIZING CONTENT WITHIN ELECTRONIC FILES USING EXAMPLE SETS

REFERENCE TO RELATED APPLICATIONS

This application claims priority to U.S. Provisional Application Ser. No. 61/197,942 titled MACHINE VISION BY EXAMPLE which was filed on Oct. 31, 2008 by David Williams and Duc Chau, which is hereby incorporated by reference in its entirety, including, any appendices, screen shots, and references therein.

TECHNICAL FIELD

This application generally relates to advertisements, and, more particularly, to determining whether or not a received image contains appropriate or inappropriate content by using a plurality of training images having known content.

BACKGROUND

The internet is a global system of interconnected computer networks that interchange data by packet switching using standardized Transmission Control Protocol/Internet Protocol (TCP/IP). The computer networks are linked by copper wires, fiber-optic cables, wireless connections, and other technologies. Accessible via the internet is the World Wide Web (WWW), which is a system of interlinked hypertext documents. With a web browser, users may view webpages through the WWW.

Webpages consist of hypertext markup language (HTML) along with associated files for graphics and scripts. Hypertext links are also provided on webpages. These links allow a user to navigate to webpages pointed to by the link. Certain links within the webpages provide advertisements which deliver marketing messages to attract customers. Use of the Internet to advertise products and services often take the form of banner advertisements, pop-up advertisements, interstitials, frame advertisements, and the like. However, the content of these advertisements has been called into question.

Content filtering prevents inappropriate advertisements or ads from being displayed on a webpage generated by a web publisher. Filtering rules can be set by the web page publisher when requesting ads from an advertisement or ad server. Nonetheless, content provided within images have been difficult to filter. These images are represented by pixels having color and shading typically providing no indication to a computer whether it is inappropriate or not. Previous systems matching the shape and other distinguishing features have taken large amounts of processing time and memory making it virtually impossible to process multiple images. Furthermore, characterizing shapes within an image does not necessarily determine whether the image is inappropriate or not.

SUMMARY

This summary is provided to introduce a selection of concepts in a simplified form that are further described below in the DESCRIPTION OF THE APPLICATION. This summary is not intended to identify key features of the claimed subject matter, nor is it intended to be used as an aid in determining the scope of the claimed subject matter.

In accordance with one aspect of the present application, a system for identifying appropriate or inappropriate content is presented. The system includes at least one processor. In addition, the system includes a database for storing information about a plurality of training set images. The information includes numerical data along with a human judged label associated with each training set image in a BigMatrix. The BigMatrix is used to form a RandomForest for determining patterns within the plurality of training set images. Furthermore, the system includes a memory operatively coupled to the processor, the memory having program instructions configured to cause the processor to take specific actions that the instructions, when executed by the processor, cause the processor to perform processes.

In one embodiment, the processes include receiving an image from a client computer, converting the image into numerical data, and traversing the RandomForest using the numerical data from the image until leaf nodes of the RandomForest are reached. Each leaf node contains a vote identifying the image as inappropriate or appropriate. In addition, the processes include taking a majority rule of the votes and returning an overall response based on the majority rule of the votes to the client computer.

In accordance with another aspect of the present application, a computer-implemented method for determining whether content contains pornography is presented. The method includes receiving the content, generating numerical data for the content, and traversing decision trees using the numerical data for the content to reach leaf nodes of the decision trees. The decision trees are constructed by numerical data generated from previously presented content and human-judged labels for the content. Each leaf node has a label describing whether the numerical data corresponds to pornography or not pornography.

In accordance with yet another aspect of the present application, a computer readable medium storing instructions for causing at least one processor to perform a method that allows a user to train a system for detecting inappropriate or appropriate content is presented. The method includes receiving a plurality of training set images along with human judged labels for each training set image. In addition, the method includes generating numerical data for each image of the plurality of training set images and creating a matrix using the numerical data and human-judged labels for each training set image, wherein each row of the matrix corresponds to an individual training set image. Furthermore, the method includes constructing decision trees using the matrix to determine patterns in the matrix, the decision trees used to detect inappropriate or appropriate content when traversed.

In accordance with another aspect of the present application, a system for detecting pornographic images within advertisements is presented. The system includes a network and an ad server for sending images displayed within advertisements, the advertisements sent via the network. In addition, the system includes a server receiving the advertisements sent via the network, wherein the server traverses a RandomForest for determining whether the images displayed within the advertisements contain inappropriate images.

In accordance with yet another aspect of the present application, a computer readable medium storing instructions for causing at least one processor to perform a method that identifies content within an image is presented. The method includes receiving a plurality of training set images along with human judged labels for each training set image, generating numerical data for each image of the plurality of training set images, creating a matrix using the numerical data and human-judged labels for each training set image, wherein each row of the matrix corresponds to an individual training set image, and constructing decision trees using the matrix to determine patterns in the matrix.

In addition, the method includes receiving an image from a client computer, converting the image into numerical data, traversing the decision trees using the numerical data from the image until leaf nodes of the decision trees are reached, each leaf node containing a vote that identifies the image as inappropriate or appropriate. Furthermore, the method includes taking a majority rule of the votes and returning an overall response based on the majority rule of the votes to the client computer.

In accordance with one aspect of the present application, a system for identifying multiple objects within an image is presented. The system includes a server coupled to a network. The server includes at least one processor and a database for storing information about a plurality of training set images. The information includes numerical data along with a human-judged label associated with each training set image in a BigMatrix. The BigMatrix is used to form a RandomForest for determining patterns within the plurality of training set images.

In addition, the server includes a memory operatively coupled to the processor, the memory having program instructions configured to cause the processor to take specific actions that the instructions, when executed by the processor, cause the processor to perform processes. These processes can include receiving an image from the network, generating image rasters from the image, converting the image rasters into numerical data, traversing the RandomForest using the numerical data from the image rasters until leaf nodes of the RandomForest are reached, each leaf node containing a vote identifying the object within the image raster, and taking a majority rule of the votes for each image raster and returning an overall response for the image rasters based on the majority rule of the votes.

BRIEF DESCRIPTION OF DRAWINGS

For a better understanding of the present application, reference is made to the below-referenced accompanying FIGURES. Reference numbers refer to the same or equivalent parts of the present application throughout the several FIGURES of the drawings.

DESCRIPTION OF THE APPLICATION

The description set forth below in connection with the appended drawings is intended as a description of presently-preferred embodiments of the application and is not intended to represent the only forms in which the present application may be constructed and/or utilized. The description sets forth the functions and the sequence of steps for constructing and operating the application in connection with the illustrated embodiments. It is to be understood, however, that the same or equivalent functions and sequences may be accomplished by different embodiments that are also intended to be encompassed within the spirit and scope of this application.

The present application relates to detecting inappropriate content within electronic files. More specifically, the present application relates to a system and method for developing patterns among a plurality of training set images with known content to later evaluate an image with unknown content. The larger the number of training set images with known content, the more effective the system and method will be in evaluating new images. As a result, the system and method converges to an arbitrary classification power as the number of reference images grows large. Furthermore, the system and method is unique in that it is firmly non-formulaic and intensely data-driven.

In an illustrative embodiment, a machine vision by example system detects appropriate or inappropriate content within a received image using a set of training images with known content. Initially, a plurality of training images are used to teach or train the machine by example. The training images are converted into numerical data and stored along with its human-judged label in a BigMatrix. Each row of this BigMatrix corresponds to an individual image. Through the BigMatrix, a RandomForest is created to discern patterns among the training images and human-judged labels. The resulting RandomForest is serialized and stored to disk for runtime loading into the machine server.

To determine whether an incoming image contains appropriate or inappropriate content, the incoming image is converted into numerical data. The numerical data is fed to the RandomForest generated from the plurality of training images converted into numerical data and human-judged labels. The numerical data is fed down each tree within the RandomForest. When the numerical data is routed down through the branches of the trees and terminated at a leaf node, a vote is cast indicated by the leaf node. Each tree traversed in the RandomForest represents a vote. The overall response of the RandomForest is given by a majority rules vote for each tree within the RandomForest.

While the primary benefit of the machine is to detect pornography within images, the machine can be used to determine other inappropriate materials as long as the machine has been trained. For example, the machine can be trained to detect hate groups who could possibly use racial hatred in their advertisements. In addition, violent ads that include gruesome images can be detected. Other content that can be determined can include illegal activity, extremist groups or cults, and online gambling advertisements. The scope of this application can also be expanded into videos, moving ads, etc.

The system and method described in this application can differentiate appropriate and inappropriate content among various countries by using different RandomForests for each country. For example, fleshbot.rubiconproject.com and fleshbot.rubiconproject.co.uk could have dissimilar RandomForests using the same set of training set images, but having different human-judged labels corresponding to the viewpoints of each country.

Determining image content is primarily described throughout this application. Nonetheless, the system and method described herein can be incorporated into multiple facets of advertising and more broadly, to the media industry as a whole. One core technology that this system and method can be applied to is classification of digital signals/media. Because digital signals/media can be converted into numerical data, the data can be placed into RandomForests and later compared to incoming digital signals/media for determining the content of the digital signal/media. One skilled in the relevant art will appreciate that the present application is not limited to images, but can also include any type of electronic file including music files, digital files, MP3s, etc.

Object recognition within image rasters can also be incorporated within the core technology. Through object recognition, parts of images are converted to numerical data and traversed down multiple RandomForests, each RandomForest representing a possible object. In one example, a portion of an incoming image can be converted into numerical data and processed among several RandomForests. The several RandomForests can correspond to a tree, house, car, etc. Processing the numerical data among the several trees results in identification of possible objects located within that portion of the image. In turn, a next portion of the incoming image can be converted into numerical data and processed again among the several RandomForests. By repeatedly performing the operations, multiple objects can be classified within the incoming image.

Classifying advertisements, a core technology, can also be implemented through the generation of RandomForests. Similar to object recognition, incoming images are converted to numerical data and traversed down multiple RandomForests with each RandomForest representing a type of advertisement. Types of advertisements can include casino/gambling ads, dating ads, game ads, and provocative ads. By classifying advertisements, certain types of ads can be prevented from being displayed on a webpage generated by a webpage publisher.

Figure 2:
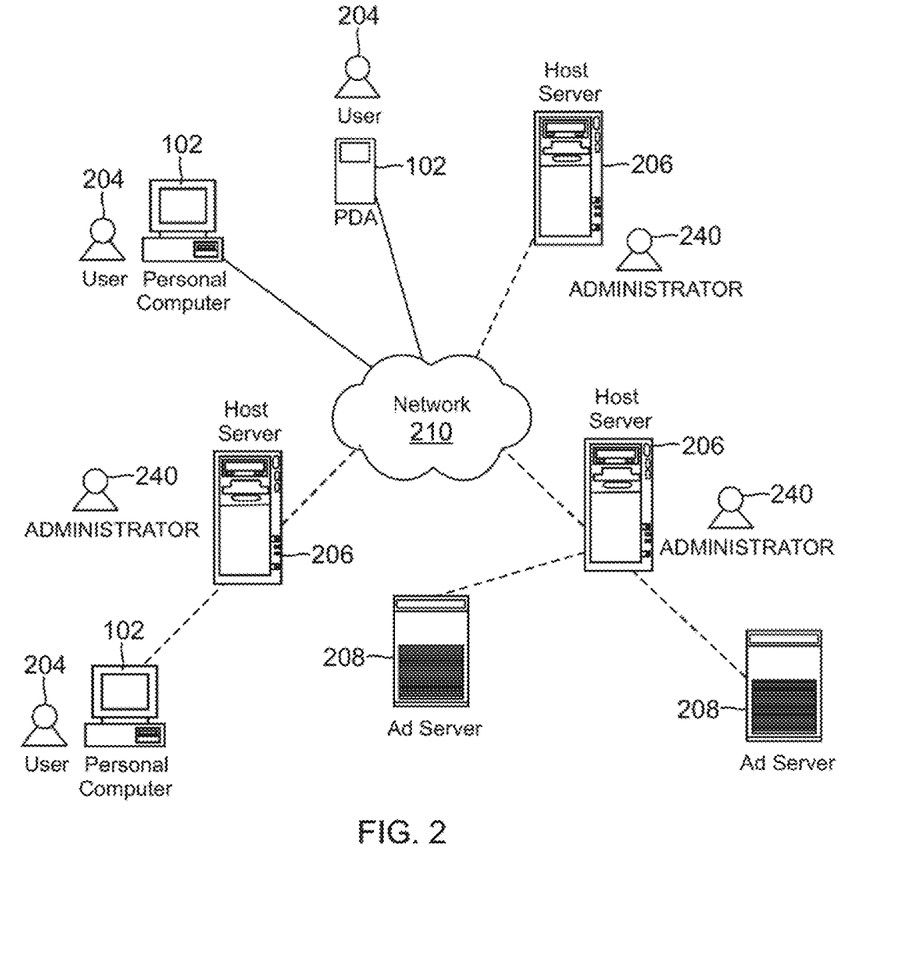
FIG. 2 is a diagram illustrating an exemplary environment for the system to detect inappropriate images in accordance with one aspect of the present application.

FIG. 2 illustrates an exemplary environment for detecting appropriate and inappropriate content. Host server 206 implements the system and method for detecting appropriate and inappropriate content and can be located in many different locations within the exemplary environment. Alternatively, and as described above, host server 206 can be used to detect objects within electronic files.

In one embodiment, host server 206 may be a standalone component whereby content is sent via network 210. In this embodiment, typically the content is uploaded to the host server 206 via network 210 by a client computer 102. In another embodiment, host server 206 can be placed between client computer 102 and network 210. Content received from network 210 may be filtered through host server 206 before reaching client computer 102. Furthermore, content uploaded onto network 210 from client computer 102 can also be filtered before reaching other users.

Alternatively, host server 206 may be placed between ad servers 208 and network 210. Host server 206 would determine appropriate and inappropriate content coming from ad servers 208. While multiple embodiments have been described, one skilled in the relevant art will appreciate that host server 206 may be placed within this environment in numerous ways and is not limited to the locations described herein.

Before host server 206 can determine the content of an image, however, host server 206 must be trained. Administrator 240, in one embodiment, can load a set of training images with known content into host server 206. Through those images, and the system and method described below, patterns can be detected within the images. Frequently, new training images with known content are loaded into the host server 206 making the system more intelligent and capable of detecting inappropriate images at higher accuracy and increased precision.

In other embodiments, host server 206 can be trained through user 204 feedback. As will be shown below, the host server 206 can take note of content that it correctly and incorrectly determines as appropriate and inappropriate.

While the term host server 206 is used throughout, one skilled in the relevant art will appreciate that the term itself is not intended to be limiting to the scope of the present application. Instead, the term host server 206 can be replaced or interchanged with server, system, machine, apparatus, or Fleshbot.

Figure 3:
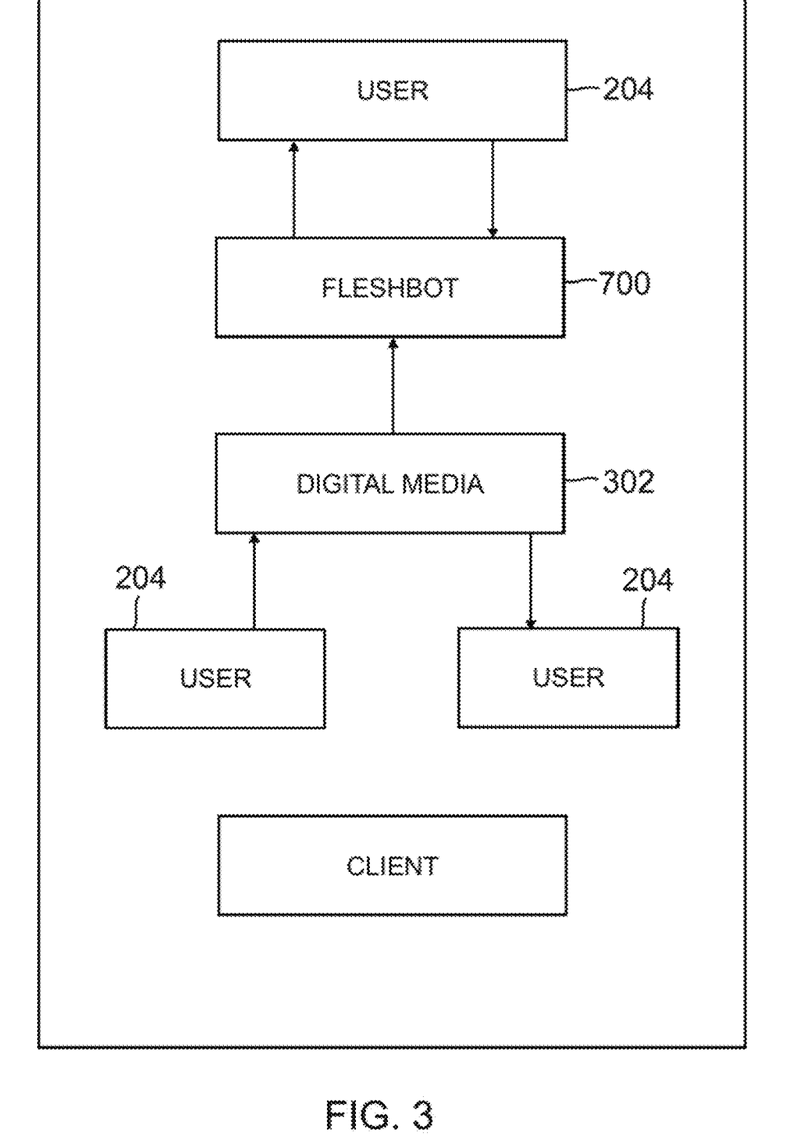
FIG. 3 shows another exemplary environment in which the system may be used in accordance with one aspect of the present application.

FIG. 3 shows another exemplary environment in which content is downloaded and uploaded in accordance with one aspect of the present application. When a user 204 uploads or downloads content, the content passes through the system 206. Each time the content passes through the system, the content can be analyzed. In the alternative, users 204 can also provided digital media 302 to the system 206.

Figure 4:
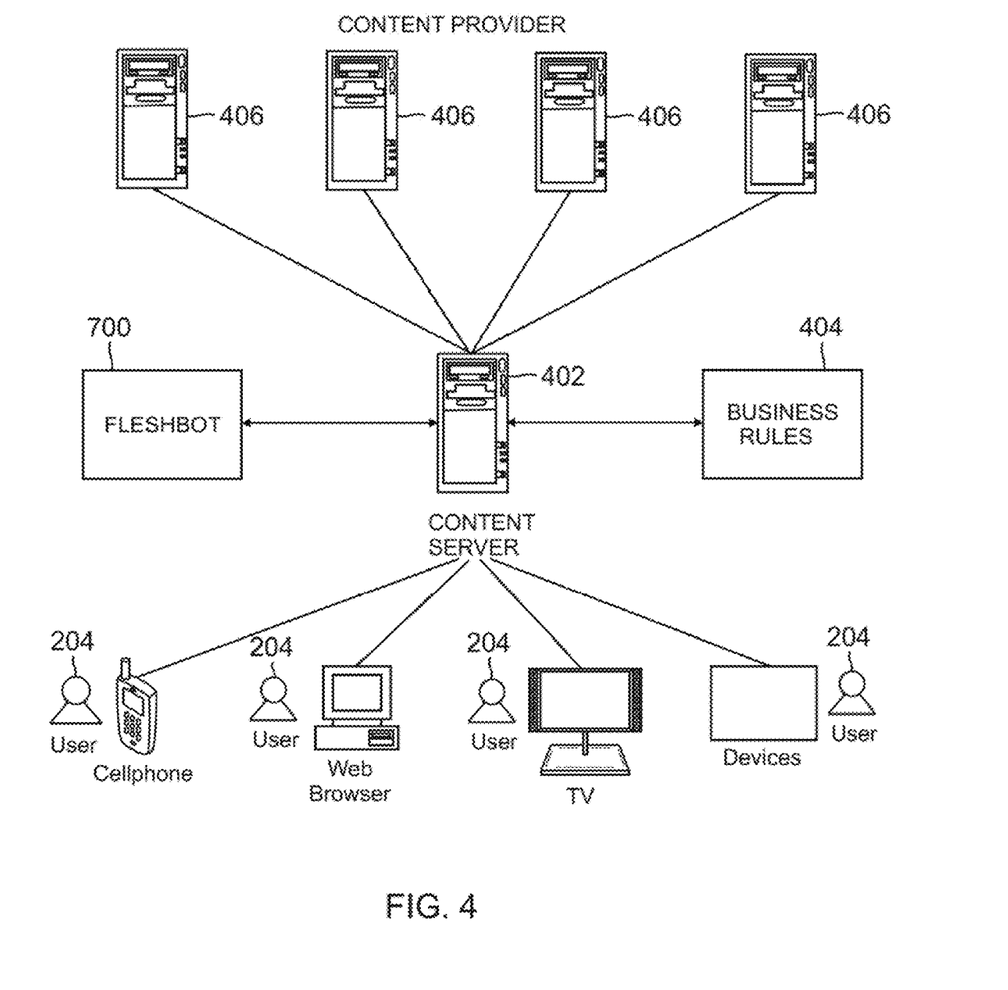
FIG. 4 depicts another exemplary environment in which the system may be used in accordance with one aspect of the present application.

FIG. 5 depicts another exemplary environment in which the system 206 may be used in accordance with one aspect of the present application. In this environment, a user 204 requests digital content from a content server 402. The content server 402 then requests content from content providers 406 and in turn, content is received by the content server 402 from the content providers 406. A plurality of business rules 404 are fed into the content server 402 and into the system 206. Using those business rules 404, the system 206 determines whether the content received by the content providers 406 is appropriate or inappropriate, returning the content to the user 204 through the content server 402 if the content is appropriate.

Figure 5:
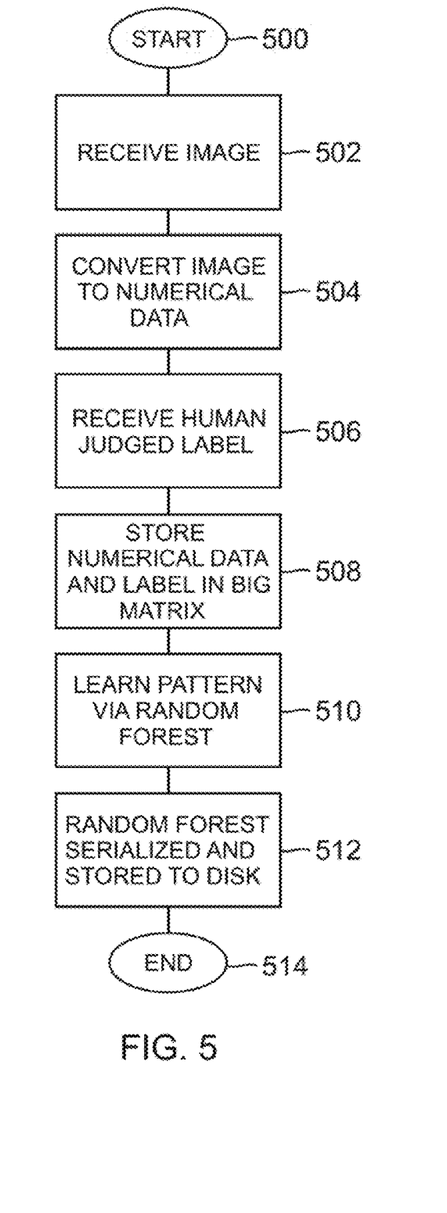
FIG. 5 is an exemplary flow chart for training the system in accordance with one aspect of the present application.

FIG. 5 is an exemplary flow chart illustrating processes for training the system 206. The system 206 learns to distinguish appropriate and inappropriate content from a very large database of human-sorted reference images called a training set beginning at block 500. At block 502, images in a training set are received. The images can be received from a variety of sources including, but not limited to, personal computer 102 or ad server 208. Each image thereafter is converted into numerical data at block 504.

Along with each image within the training set, a human judged label is received at block 506. Preferably, the label describes whether the image is pornography or non-pornography, but as described above, may include other indicative labels. Furthermore, the label does not have to be indicative, but instead can describe what the image is. For example, the label can identify the image as a tree. At block 508, the image's numerical data is stored along with its human-judged label in a BigMatrix. Each row of the matrix corresponds to an individual image.

A RandomForest is generated to determine patterns within the BigMatrix at block 510. Typically, a RandomForest is generated by constructing many decision trees and coordinating their behavior via boosting or bagging.

Boosting is relatively complex with each tree in the RandomForest trained to recognize and correct the mistakes of the other trees. Boosting uses iterative re-training, where the incorrectly classified samples are given more weight in successive training iterations.

In bagging, each decision tree in the RandomForest is trained on a randomly chosen, non-empty subset of the training examples. The subset may be the entire set of training examples with such choices being case specific. Each node in a tree is created from a randomly chosen subset of the variables. These variables are random variables in the dual sense as they are variables which were randomly chosen and they are statistical covariates with joint distribution.

A best split point is calculated amongst the random variables by a non-linear optimization routine using a goodness of split function as an objective. Common choices for such a function include the Gini Index, Statistical Entropy, or the Misclassification Rate. Tree building stops when all training examples have terminated in leaves. Leaves are generated when the remainder of the training examples at some node are all of one class (e.g., porn or non-porn). Each tree is fully grown and may or may not be pruned, which is case specific.

Preferably, the RandomForests generated by the system and method are different from the ones used by NSA or UC Berkeley, which provide RandomForests that do not ensure durable memory. Durable memory allows the system and method to never forget images that were used for training.

The RandomForest algorithm has been mathematically shown to extract minimal generalization power from any given set of reference examples. RandomForests learn every available differentiating factor present in the training-set. Wrong answers from the system correspond directly to a lack of information in the training set, not a lack of accuracy or precision in the process.

While RandomForests appears to be optimal to finding patterns within the training set images, one skilled in the relevant art will appreciate that there are other techniques that may be used in determining patterns within a given set of data such as Supper Vector Machines (SVMs), Artificial Neural Networks (ANNs), and Adaptive K-Nearest Neighbors (KNNs).

Multiple BigMatrices and RandomForests may be generated using training set images having multiple human judged labels. For example, training images can include a human judged label of pornography and another human judged label of Asian. A BigMatrix and corresponding RandomForest can be generated for the training images with the human judged label of pornography, while another BigMatrix and corresponding RandomForest can be generated for the training images with the human judged label of Asian. In general, a BigMatrix and RandomForest can be used to recognize an arbitrary number of labels.

Continuing with FIG. 5, the resulting RandomForest is serialized and stored to disk for runtime loading into the server at block 512. The process for training the machine ends at block 514. Importantly, the more images with known content that are used, the more powerful the system becomes.

Typically, the behavior of the system can be dynamically changed, even on a publisher by publisher, and URL by URL basis. Parameters include speed (versus accuracy) and sensitivity towards false positives (versus sensitivity towards false negatives). For example, polling rules can be tuned to accommodate different risks performances. Ads can be held in quarantine if even 30% of the trees flag it as porn, with the understanding that doing so will increase the rate of false positive porn identification significantly.

Figure 6:
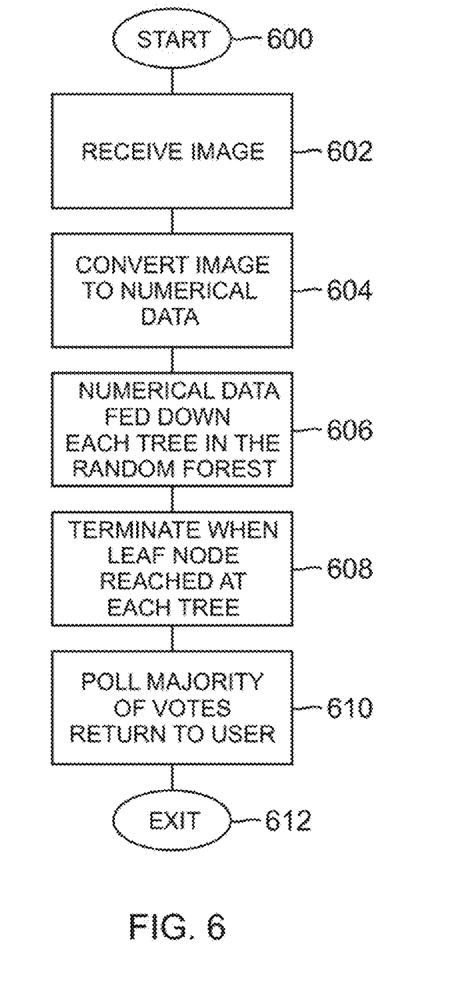
FIG. 6 is an exemplary flow chart for using the system in accordance with one aspect of the present application.

FIG. 6 provides exemplary processes for determining whether an image contains appropriate or inappropriate content based on provided training images stored as a RandomForest beginning at block 600. At block 602, images are received. Again, the images can be received by a variety of sources including, but not limited to, personal computer 102 or ad server 208. The incoming image is converted into numerical data at block 604.

After the image has been converted into numerical data, the numerical data is fed into the RandomForest at block 606. The RandomForest is itself an array of decision trees, which can also be called a tree ensemble. The numerical data is fed down each tree in the ensemble. Given some tree, the numerical data is routed down to its branches until it terminates at a leaf node at block 608. The leaf node contains a label, and that label is the tree's vote. At block 610, a poll of the majority votes is taken and returned to the user. The overall response of the RandomForest is given by a majority rules vote of the tree ensemble.

Figure 7:
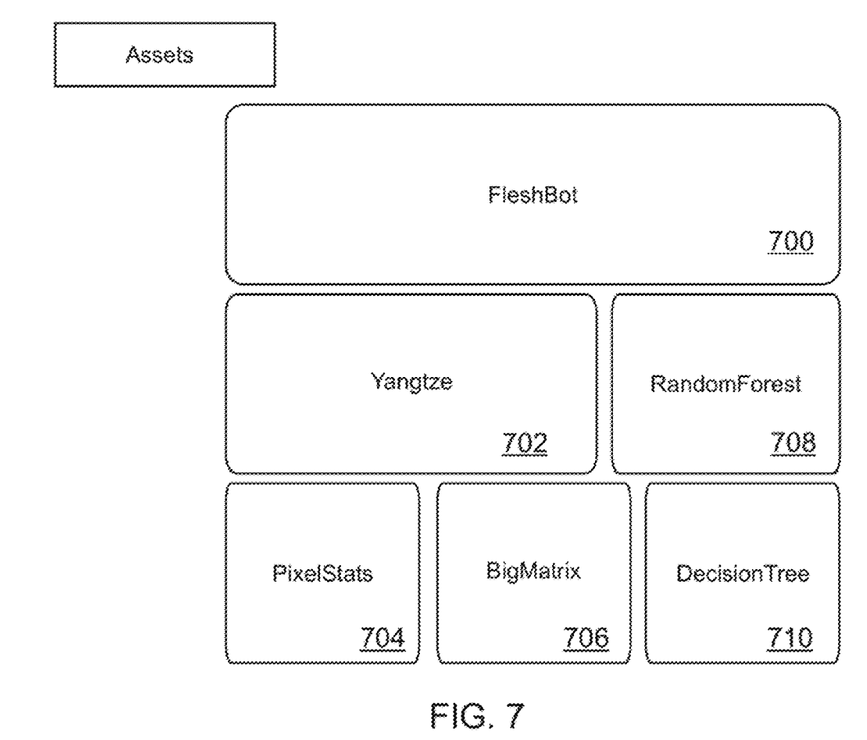
FIG. 7 illustrates exemplary functional components of the system in accordance with one aspect of the present application.

The system 206, as shown in FIG. 7, includes many functional components. As provided within one embodiment of the present application, the system 206 may include a static web server, called FleshBot 700, compiled optimally with regard to loading and executing machine learning objects. Below the FleshBot 700 layer, object libraries for processing huge volumes of arbitrary images into a format friendly to machine learning and machine vision applications is used, this layer is called Yangtze 702. Below the Yangtze layer 702 are the PixelStats 704 and BigMatrix 706 layers. The PixelStats 704 layer provides function libraries for representing arbitrary images as equidimensional feature vectors, including edge detection, point-cloud registration, inter-image shape relevance, and descriptive statistics. The BigMatrix 706 layer includes object libraries for managing very large tables of statistical data, with an emphasis on rapid and correct consumption by machine learning algorithms.

Also below the FleshBot 700 layer is the RandomForest 708 layer. The RandomForest 708 layer includes object libraries for training, serializing and deploying an arbitrary number of coordinated decision trees subject to bootstrap aggregation (quasi-randomized learning). Below the RandomForest 708 layer is the DecisionTree 710 layer.

Figure 8:
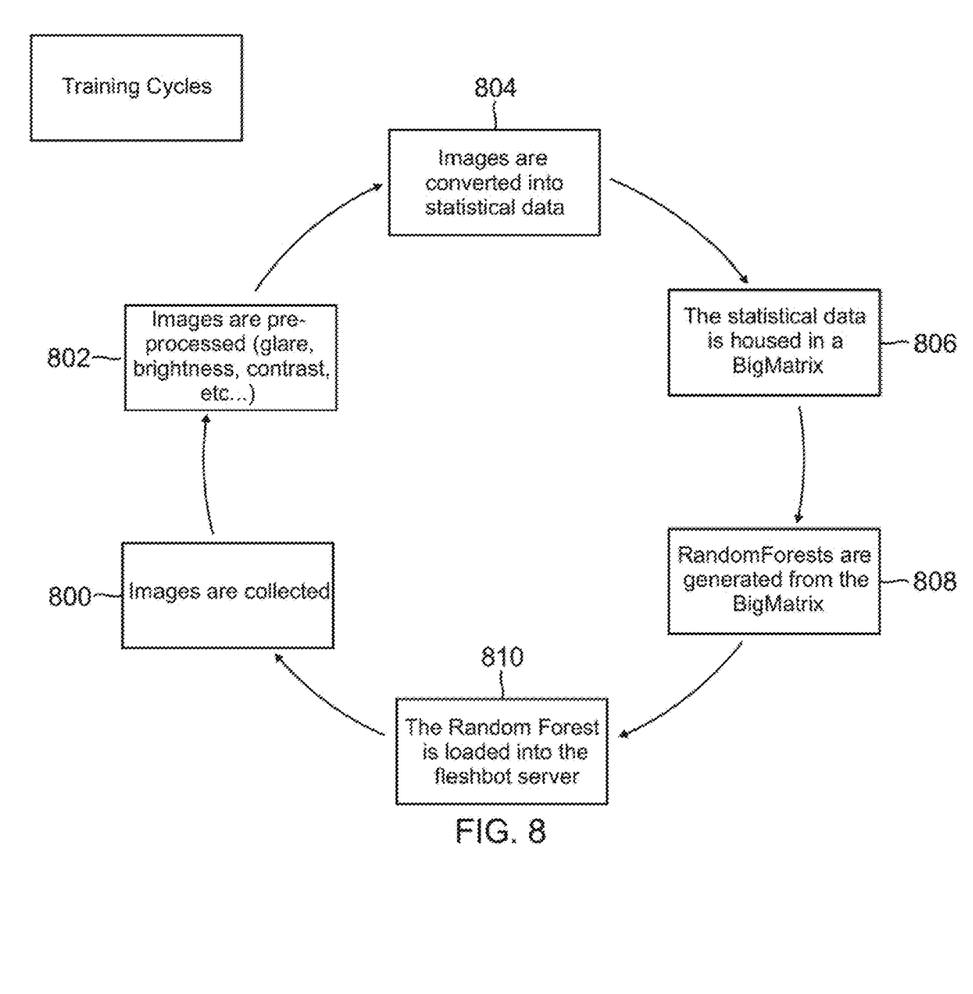
FIG. 8 shows exemplary routines for training the system in accordance with one aspect of the present application.

FIG. 8 shows exemplary routines for training the system 206 in accordance with one aspect of the present application. Initially, images are collected at block 800. To make the system more robust to statistical noise, images are preprocessed at block 802. Glare, brightness, contrast, etc. can be adjusted for each training image within the training set to ensure all images are brought into common lighting without altering their "true" content. Thereafter, the images are typically converted into statistical data at block 804.

Once the images are converted into statistical data, the data is housed in a BigMatrix at block 806. At block 808, RandomForests are generated using the data from the BigMatrix. The RandomForest is then loaded into the server at block 810 with control returning back to block 800. Through these exemplary routines, images can be uploaded, processed, and stored into the system on a frequency basis.

Figure 9:
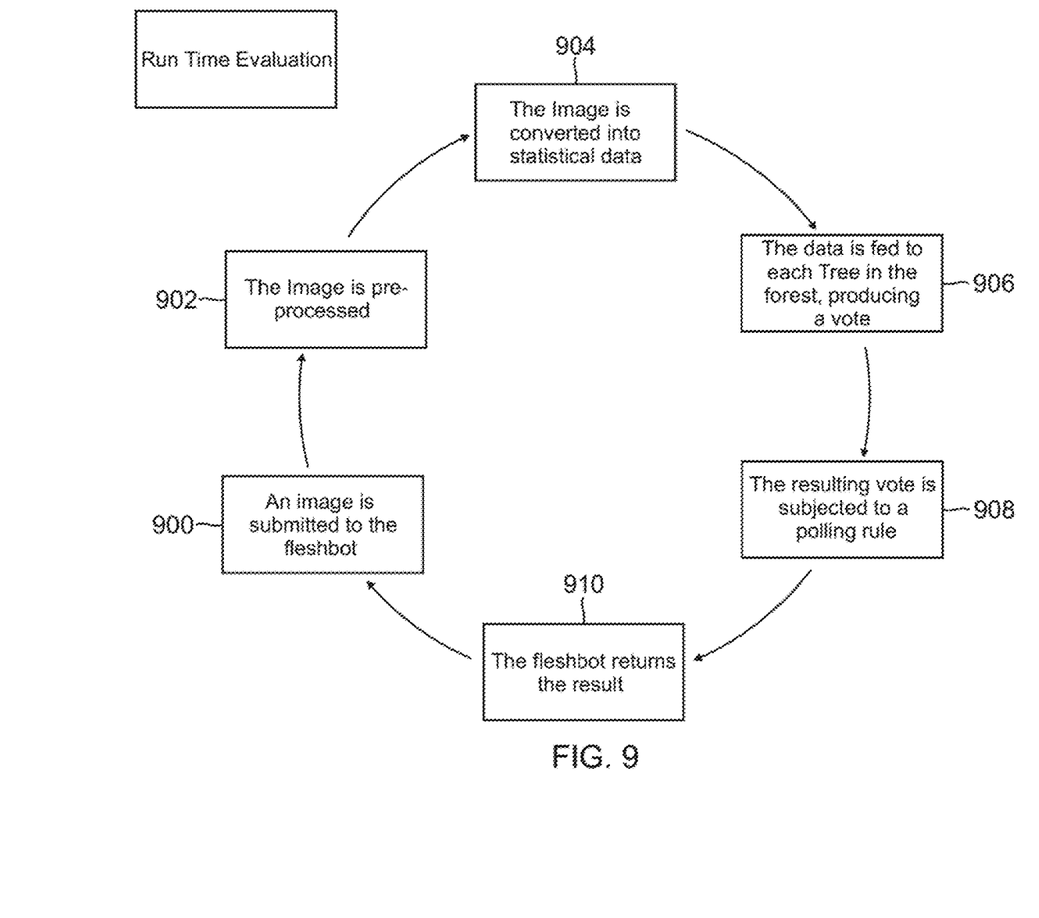
FIG. 9 depicts exemplary routines for running the system in accordance with one aspect of the present application.

FIG. 9 depicts exemplary routines for running the system in accordance with one aspect of the present application. Initially, images are submitted to the system at block 900. To make the system more robust to statistical noise, images can be preprocessed at block 902. Glare, brightness, contrast, etc. can be adjusted for each received image. Thereafter, the images are generally converted into statistical data at block 904.

Once the images are converted into statistical data, the data is fed into each tree of the RandomForest to produce a vote at block 906. Each tree produces a vote. At block 908, the resulting votes are subjected to a polling rule. The system returns the results at block 910 with control returned back to block 900.

Often, the user 204 is invited to help contribute to the machine learning process by stating whether the image was classified correctly. In the worst case scenario, the machine vision by example system 206 is simply a database of known images i.e., a white list and black list. In the best case scenario, the system 206 is a prescient oracle with regard to image recognition. Generally, the system 206 is about 85% accurate with 29,500 reference images. Thus, the more reference images available, the more powerful the system 206 becomes. The return on generalization (ROG) is massive.

The machine vision by example system 206 continuously improves as new images are acquired and learned. As the number of reference images grows large, the system converges to arbitrary classification power. Furthermore, the process is unique in that it is the first to be firmly non-formulaic and intensively data driven.

Applications of the machine vision by example system 206 can be implemented in almost any scenario where images are provided. In one embodiment, the machine vision by example system can be used to filter advertisements produced by ad networks. In today's sensitive consumer groups, advertisements displaying pornography, hate groups, violence, illegal activity, extremist groups, cults, and online gambling may prompt a webpage publisher who uses the ad network to take their business elsewhere. Through the machine vision by example system, the ads can be filtered to generate only appropriate content.

Figure 1:
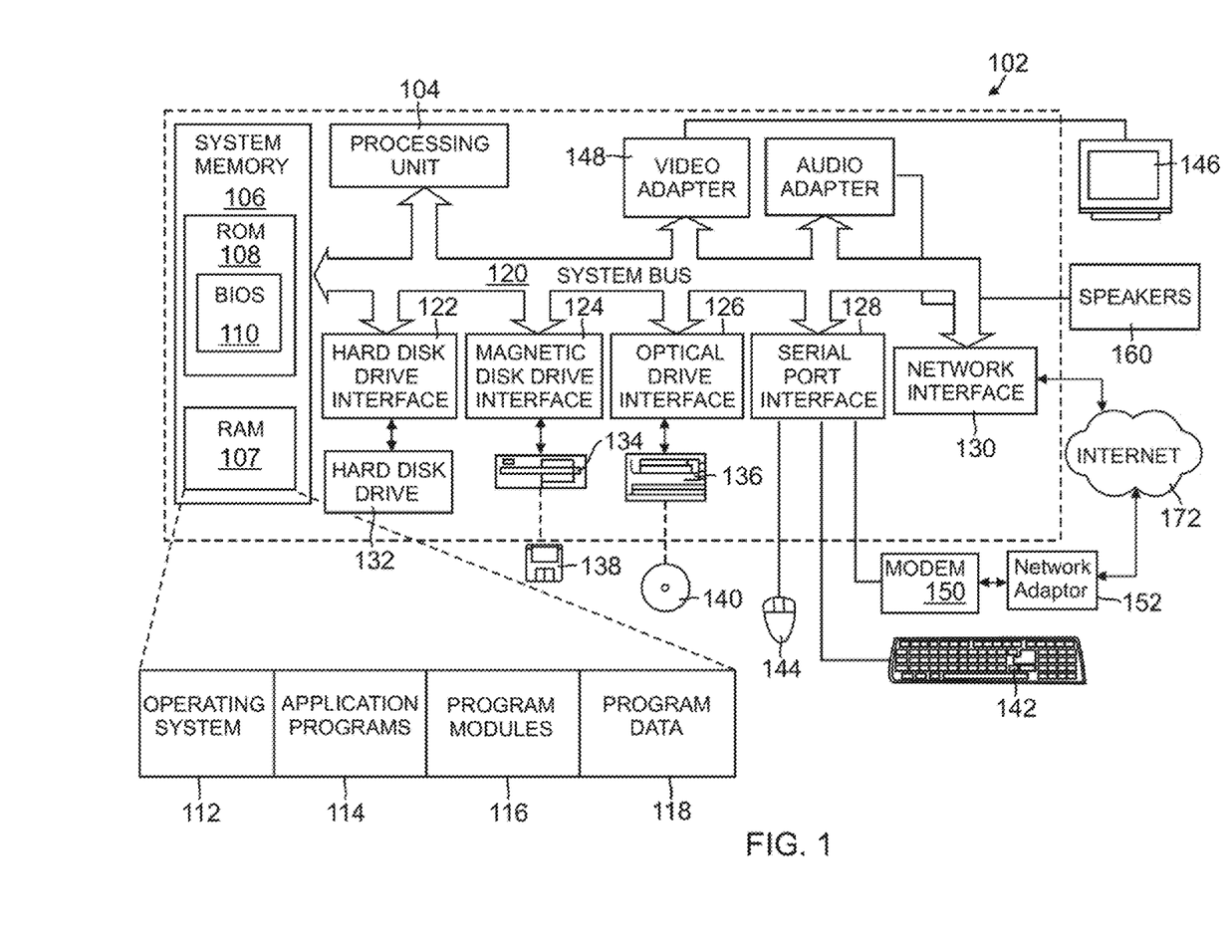
FIG. 1 is a block diagram that shows an exemplary illustrative computer architecture used for receiving and possibly sending images in accordance with one aspect of the present application.

An exemplary hardware and operating environment for implementing client computer 102 to connect to host server 206 for detecting inappropriate content is shown in FIG. 1. Client computer 102 may take the form of a cell phone, personal digital assistant (PDA), lap top computer, stationary personal computer, IPTV remote control, web tablet, laptop computer, pocket PC, a television set capable of receiving IP based video services and mobile IP device, etc. The client computer 102 may be in the form of a computer 102, including a processing unit 104, a system memory 106, and a system bus 120 that operatively couples various system components, including the system memory 106 to the processing unit 104. There may be only one or there may be more than one processing unit 104, such that the processor of computer 102 comprises a single central processing unit (CPU), or a plurality of processing units, commonly referred to as a parallel processing environment. The computer 102 may be a conventional computer, a distributed computer, a web server, a file server, or any other type of computer.

The system bus 120 may be any of several types of bus structures including a memory bus or memory controller, a peripheral bus, a switched fabric, point-to-point connections, and a local bus using any of a variety of bus architectures. The system memory 106 may also be referred to as simply the memory, and includes read only memory (ROM) 108 and random access memory (RAM) 107. A basic input/output system (BIOS) 110, containing the basic routines that help to transfer information between elements within the computer 102, such as during start-up, is stored in ROM 108. The computer 102 further includes a hard disk drive 132 for reading from and writing to a hard disk, not shown, a magnetic disk drive 134 for reading from or writing to a removable magnetic disk 138, and an optical disk drive 136 for reading from or writing to a removable optical disk 140 such as a CD ROM or other optical media.

The hard disk drive 132, magnetic disk drive 134, and optical disk drive 136 are connected to the system bus 120 by a hard disk drive interface 122, a magnetic disk drive interface 124, and an optical disk drive interface 126, respectively. The drives and their associated computer-readable media provide non-volatile storage of computer-readable instructions; data structures, e.g., a catalog and a context-based index; program modules, e.g., a web service and an indexing robot; and other data for the computer 102. It should be appreciated by those skilled in the art that any type of computer-readable media that can store data that is accessible by a computer, for example, magnetic cassettes, flash memory cards, digital video disks, RAM, and ROM, may be used in the exemplary operating environment.

A number of program modules may be stored on the hard disk 132, magnetic disk 134, optical disk 136, ROM 108, or RAM 107, including an operating system 112, one or more application programs 114, other program modules 116, and program data 118. A user may enter commands and information into the personal computer 102 through input devices such as a keyboard 142 and pointing device 144, for example, a mouse. Other input devices (not shown) may include, for example, a microphone, a joystick, a game pad, a tablet, a touch screen device, a satellite dish, a scanner, a facsimile machine, and a video camera. These and other input devices are often connected to the processing unit 104 through a serial port interface 128 that is coupled to the system bus 120, but may be connected by other interfaces, such as a parallel port, game port or a universal serial bus (USB).

A monitor 146 or other type of display device is also connected to the system bus 120 via an interface, such as a video adapter 148. In addition to the monitor 146, computers typically include other peripheral output devices, such as a printer and speakers 160. These and other output devices are often connected to the processing unit 104 through the serial port interface 128 that is coupled to the system bus 120, but may be connected by other interfaces, such as a parallel port, game port, or a universal serial bus (USB).

The computer 102 may operate in a networked environment using logical connections to one or more remote computers. These logical connections may be achieved by a communication device coupled to or integral with the computer 102; the application is not limited to a particular type of communications device. The remote computer may be another computer, a server, a router, a network personal computer, a client, a peer device, or other common network node, and typically includes many or all of the elements described above relative to the computer 102, although only a memory storage device has been illustrated in FIG. 1. Computer 102 can be logically connected to the internet 172. The logical connection can include a local area network (LAN), wide area network (WAN), personal area network (PAN), campus area network (CAN), metropolitan area network (MAN), or global area network (GAN). Such networking environments are commonplace in office networks, enterprise-wide computer networks, intranets and the Internet, which are all types of networks.

When used in a LAN environment, the computer 102 may be connected to the local network through a network interface or adapter 130, which is one type of communications device. When used in a WAN environment, the computer 102 typically includes a modem 150, a network adapter 152, or any other type of communications device for establishing communications over the wide area network. The modem 150, which may be internal or external, is connected to the system bus 120 via the serial port interface 128. In a networked environment, program modules depicted relative to the personal computer 102, or portions thereof, may be stored in a remote memory storage device. It is appreciated that the network connections shown are exemplary and other means of and communications devices for establishing a communications link between the computers may be used.

The technology described herein may be implemented as logical operations and/or modules in one or more systems. The logical operations may be implemented as a sequence of processor-implemented steps executing in one or more computer systems and as interconnected machine or circuit modules within one or more computer systems. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

The system can take the form of an entirely hardware embodiment, an entirely software embodiment or an embodiment containing both hardware and software elements. In one embodiment, the system is implemented in software, which includes but is not limited to firmware, resident software, microcode, etc.

Furthermore, the system can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium comprise a semiconductor or solid-state memory, magnetic tape, a removable computer diskette, a random access memory (RAM), a read-only memory (ROM), a rigid magnetic disk and an optical disk. Current examples of optical disks comprise compact disk-read only memory (CD-ROM), compact disk-read/write (CD-R/W) and DVD.

A data processing system suitable for storing and/or executing program code comprises at least one processor coupled directly or indirectly to memory elements through a system bus. The memory elements can include local memory employed during actual execution of the program code, bulk storage, and cache memories that provide temporary storage of at least some program code in order to reduce the number of times code is retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Described above, aspects of the present application are embodied in a World Wide Web ("WWW") or ("Web") site accessible via the Internet. As is well known to those skilled in the art, the term "Internet" refers to the collection of networks and routers that use the Transmission Control Protocol/Internet Protocol ("TCP/IP") to communicate with one another. The internet can include a plurality of local area networks ("LANs") and a wide area network ("WAN") that are interconnected by routers. The routers are special purpose computers used to interface one LAN or WAN to another. Communication links within the LANs may be wireless, twisted wire pair, coaxial cable, or optical fiber, while communication links between networks may utilize 56 Kbps analog telephone lines, 1 Mbps digital T-1 lines, 45 Mbps T-3 lines or other communications links known to those skilled in the art.

Furthermore, computers and other related electronic devices can be remotely connected to either the LANs or the WAN via a digital communications device, modem and temporary telephone, or a wireless link. It will be appreciated that the internet comprises a vast number of such interconnected networks, computers, and routers.

The Internet has recently seen explosive growth by virtue of its ability to link computers located throughout the world. As the Internet has grown, so has the WWW. As is appreciated by those skilled in the art, the WWW is a vast collection of interconnected or "hypertext" documents written in Hyper-Text Markup Language ("HTML"), or other markup languages, that are electronically stored at or dynamically generated by "WWW sites" or "Web sites" throughout the Internet. Additionally, client-side software programs that communicate over the Web using the TCP/IP protocol are part of the WWW, such as JAVA® applets, instant messaging, e-mail, browser plug-ins, Macromedia Flash, chat and others. Other interactive hypertext environments may include proprietary environments such as those provided in America Online or other online service providers, as well as the "wireless Web" provided by various wireless networking providers, especially those in the cellular phone industry. It will be appreciated that the present application could apply in any such interactive communication environments; however, for purposes of discussion, the Web is used as an exemplary interactive hypertext environment with regard to the present application.

A Web site is a server/computer connected to the Internet that has massive storage capabilities for storing hypertext documents and that runs administrative software for handling requests for those stored hypertext documents as well as dynamically generating hypertext documents. Embedded within a hypertext document are a number of hyperlinks, i.e., highlighted portions of text which link the document to another hypertext document possibly stored at a Web site elsewhere on the Internet. Each hyperlink is assigned a Uniform Resource Locator ("URL") that provides the name of the linked document on a server connected to the Internet. Thus, whenever a hypertext document is retrieved from any web server, the document is considered retrieved from the World Wide Web. Known to those skilled in the art, a web server may also include facilities for storing and transmitting application programs, such as application programs written in the JAVA® programming language from Sun Microsystems, for execution on a remote computer. Likewise, a web server may also include facilities for executing scripts and other application programs on the web server itself.

A remote access user may retrieve hypertext documents from the World Wide Web via a web browser program. A web browser, such as Netscape's NAVIGATOR®, Mozilla Foundation's Firefox, Google Inc.'s Chrome, Apple Computer's Safari, or Microsoft's Internet Explorer, is a software application program for providing a user interface to the WWW. Upon request from the remote access user via the web browser, the web browser requests the desired hypertext document from the appropriate web server using the URL for the document and the HyperText Transport Protocol ("HTTP"). HTTP is a higher-level protocol than TCP/IP and is designed specifically for the requirements of the WWW. HTTP runs on top of TCP/IP to transfer hypertext documents and user-supplied form data between server and client computers. The WWW browser may also retrieve programs from the web server, such as JAVA® applets, for execution on the client computer. Finally, the WWW browser may include optional software components, called plug-ins, that run specialized functionality within the browser.

In accordance with one aspect of the present application, a system for identifying appropriate or inappropriate content is presented. The system includes at least one processor. In addition, the system includes a database for storing information about a plurality of training set images. The information includes numerical data along with a human-judged label associated with each training set image in a BigMatrix. The BigMatrix is used to form a RandomForest for determining patterns within the plurality of training set images. Furthermore, the system includes a memory operatively coupled to the processor, the memory having program instructions configured to cause the processor to take specific actions that the instructions, when executed by the processor, cause the processor to perform processes.

The processes can include receiving an image from a client computer, converting the image into numerical data, and traversing the RandomForest using the numerical data from the image until leaf nodes of the RandomForest are reached. Each leaf node contains a vote identifying the image as inappropriate or appropriate. In addition, the processes include determining a majority rule of the votes and returning an overall response based on the majority rule of the votes to the client computer.

The content can be pornographic material, hate advertisements, gruesome, and gambling advertisements. In one embodiment, the program instructions stored in the memory are configured to cause the processor to take specific actions that the instructions, when executed by the processor, cause the processor to further receive the plurality of training set images, generate the BigMatrix using the plurality of training set images, and generate the RandomForest using the BigMatrix.

In one embodiment, generating the RandomForest using the BigMatrix includes constructing many decision trees and coordinating their behavior via boosting. Alternatively, generating the RandomForest using the BigMatrix includes constructing many decision trees and coordinating their behavior via bagging. In one embodiment, the program instructions stored in the memory are configured to cause the processor to take specific actions that the instructions, when executed by the processor, cause the processor to further serialize and store the RandomForest into the database for runtime loading.

In accordance with another aspect of the present application, a computer-implemented method for determining whether content contains pornography is presented. The method includes receiving the content, generating numerical data for the content, and traversing decision trees using the numerical data for the content to reach leaf nodes of the decision trees. The decision trees are constructed by numerical data generated from previously presented content and human-judged labels for the content. Each leaf node has a label describing whether the numerical data corresponds to pornography or not pornography.

In one embodiment, the content includes sound, movies, images, digital signals/media, and image rasters. In one embodiment, human-judged labels for the content vary from country to country resulting in unique decision trees for each country. In one embodiment the numerical data for the content is an array of numbers representing the content.

In accordance with yet another aspect of the present application, a computer readable medium storing instructions for causing at least one processor to perform a method that allows a user to train a system for detecting inappropriate or appropriate content is presented. The method includes receiving a plurality of training set images along with human judged labels for each training set image. In addition, the method includes generating numerical data for each image of the plurality of training set images and creating a matrix using the numerical data and human-judged labels for each training set image, wherein each row of the matrix corresponds to an individual training set image. Furthermore, the method includes constructing decision trees using the matrix to determine patterns in the matrix, the decision trees used to detect inappropriate or appropriate content when traversed.

In one embodiment, the method further includes retraining the system for detecting inappropriate or appropriate content. In one embodiment, retraining the system includes receiving a new plurality of training set images along with new human-judged labels for each new training set image, generating numerical data for each new image of the new plurality of training set images, appending new entries to the matrix using the generated numerical data for each new image of the new plurality of training set images, and adding new trees, branches, and leaves to the decision trees using the new entries from the matrix to determine new patterns in the matrix.

In accordance with another aspect of the present application, a system for detecting pornographic images within advertisements is presented. The system includes a network and an ad server for sending images displayed within advertisements, the advertisements sent via the network. In addition, the system includes a server receiving the advertisements sent via the network, wherein the server traverses a RandomForest for determining whether the images displayed within the advertisements contain inappropriate images.

In one embodiment, the system includes a user agent, wherein the user agent receives the advertisements if the advertisements do not contain inappropriate images. The user agent can be a smartphone, a handheld device, a desktop computer, or a laptop computer.

In accordance with yet another aspect of the present application, a computer readable medium storing instructions for causing at least one processor to perform a method that identifies content within an image is presented. The method includes receiving a plurality of training set images along with human-judged labels for each training set image, generating numerical data for each image of the plurality of training set images, creating a matrix using the numerical data and human-judged labels for each training set image, wherein each row of the matrix corresponds to an individual training set image, and constructing decision trees using the matrix to determine patterns in the matrix.

In addition, the method includes receiving an image from a client computer, converting the image into numerical data, traversing the decision trees using the numerical data from the image until leaf nodes of the decision trees are reached, each leaf node containing a vote identifying the image as inappropriate or appropriate. Furthermore, the method includes taking a majority rule of the votes and returning an overall response based on the majority rule of the votes to the client computer.

In accordance with one aspect of the present application, a system for identifying multiple objects within an image is presented. The system includes a server coupled to a network. The server includes at least one processor and a database for storing information about a plurality of training set images. The information includes numerical data along with a human judged label associated with each training set image in a BigMatrix. The BigMatrix is used to form a RandomForest for determining patterns within the plurality of training set images.

In addition, the server includes a memory operatively coupled to the processor, the memory having program instructions configured to cause the processor to take specific actions that the instructions, when executed by the processor, cause the processor to perform processes. These processes can include receiving an image from the network, generating image rasters from the image, converting the image rasters into numerical data, traversing the RandomForest using the numerical data from the image rasters until leaf nodes of the RandomForest are reached, each leaf node containing a vote identifying the object within the image raster, and taking a majority rule of the votes for each image raster and returning an overall response for the image rasters based on the majority rule of the votes.

In one embodiment, the image is received from a host server, a client device, or an ad server.

The foregoing description is provided to enable any person skilled in the relevant art to practice the various embodiments described herein. Various modifications to these embodiments will be readily apparent to those skilled in the relevant art, and generic principles defined herein may be applied to other embodiments. Thus, the claims are not intended to be limited to the embodiments shown and described herein, but are to be accorded the full scope consistent with the language of the claims, wherein reference to an element in the singular is not intended to mean "one and only one" unless specifically stated, but rather "one or more." All structural and functional equivalents to the elements of the various embodiments described throughout this disclosure that are known or later come to be known to those of ordinary skill in the relevant art are expressly incorporated herein by reference and intended to be encompassed by the claims. Moreover, nothing disclosed herein is intended to be dedicated to the public regardless of whether such disclosure is explicitly recited in the claims.

What is claimed is:

1. A computer-implemented method for determining whether content contains pornography, the method comprising:
    receiving the content;
    generating numerical data derived from characteristics of the content;
    traversing decision trees using the numerical data for the content to reach leaf nodes of the decision trees, wherein the decision trees are constructed by numerical data generated from previously presented content and human-judged labels for the content, each leaf node having a label describing whether the numerical data corresponds to pornography or not pornography;
    removing the content if a majority of the leaf nodes return a vote that the content corresponds to pornography; and
    retraining for detecting inappropriate or appropriate content including:
    receiving a new plurality of training set images along with new human-judged labels for each new training set image;
    generating numerical data for each new image of the new plurality of training set images;
    appending new entries to the matrix using the generated numerical data for each new image of the new plurality of training set images; and
    adding new trees, branches, and leaves to the decision trees using the new entries from the matrix to determine new patterns in the matrix.

2. The computer-implemented method of claim 1, wherein the content comprises sound.

3. The computer-implemented method of claim 1, wherein the content comprises movies.

4. The computer-implemented method of claim 1, wherein the content comprises images.

5. The computer-implemented method of claim 1, wherein the content comprises digital signals/media.

6. The computer-implemented method of claim 1, wherein the content comprises image rasters.

7. The computer-implemented method of claim 1, wherein human-judged labels for the content vary from country to country resulting in unique decision trees for each country.

8. The computer-implemented method of claim 1, wherein the numerical data for the content is an array of numbers representing the content.

9. The computer-implemented method of claim 1, further comprising:
    preprocessing the previously presented contact prior to constructing the decision trees; and
    wherein generating the numerical data includes preprocessing the received content in the same manner as the previously presented content.

10. The computer-implemented method of claim 9, wherein preprocessing the previously presented content includes adjusting at least one image parameter.

11. The computer-implemented method of claim 10, wherein adjusting the at least one image parameter includes adjusting at least one of glare, brightness, and contrast.

12. The computer-implemented method of claim 1, further comprising:
    creating a RandomForest including each of the decision trees; and
    wherein traversing the decision trees includes traversing the decision trees of the RandomForest; and
    collecting a vote from each decision tree in the RandomForest.

13. A non-transitory computer readable medium storing instructions for causing at least one processor to perform a method of training a system for detecting inappropriate or appropriate content, the method comprising:
    receiving a plurality of training set images along with human-judged labels for each training set image;
    generating numerical data for each image of the plurality of training set images;
    creating a matrix using the numerical data and human-judged labels for each training set image, wherein each row of the matrix corresponds to an individual training set image; and
    constructing decision trees using the matrix to determine patterns in the matrix, the decision trees used to detect inappropriate or appropriate content when traversed;
    receiving a new plurality of training set images along with new human-judged labels for each new training set image;
    generating numerical data for each new image of the new plurality of training set images;
    appending new entries to the matrix using the generated numerical data for each new image of the new plurality of training set images; and
    adding new trees, branches, and leaves to the decision trees using the new entries from the matrix to determine new patterns in the matrix.

14. The non-transitory computer readable medium of claim 13, wherein the method further comprises retraining the system for detecting inappropriate or appropriate content.

15. The non-transitory computer readable medium of claim 13, wherein the method further comprises coordinating the behavior of the decision trees via boosting.

16. The non-transitory computer readable medium of claim 13, wherein the method further comprises coordinating the behavior of the decision trees via bagging.

17. The non-transitory computer readable medium of claim 13, wherein the method further comprises serializing and storing the decision trees in the database for runtime loading.

18. A system for identifying appropriate or inappropriate content, the system comprising:
   at least one processor;
   a database for storing information about a plurality of training set images, wherein the information includes numerical data along with a human-judged label associated with each training set image in a BigMatrix, the BigMatrix being configured to form a RandomForest for determining patterns within the plurality of training set images;
   a memory operatively coupled to the processor, the memory having program instructions configured to cause the processor to:
      receive an image from a client computer;
      convert the image into numerical data;
      traverse the RandomForest using the numerical data from the image until leaf nodes of the RandomForest are reached, each leaf node containing a human-judged label and a vote identifying the image as inappropriate or appropriate;
      distribute to the client computer a signal that the image contains inappropriate content if a majority of the votes is of a first mode and a signal that the image does not contain inappropriate content if the majority of the votes is of a second mode;
   receive a new plurality of training set images along with new human-judged labels for each new training set image;
   generate numerical data for each new Image of the new plurality of training set images;
   append new entries to the matrix using the generated numerical data for each new image of the new plurality of training set images; and
   add new trees, branches, and leaves to the decision trees using the new entries from the matrix to determine new patterns in the matrix.

19. The system of claim 18, wherein the content is pornographic material.

20. The system of claim 18, wherein the content is hate advertisements.

21. The system of claim 18, wherein the content is gambling advertisements.

22. The system of claim 18, wherein the memory having program instructions further configured to cause the processor to:
   receive the plurality of training set images,
   generate the BigMatrix using the plurality of training set images; and
   form the RandomForest using the BigMatrix.

23. A non-transitory computer readable medium storing instructions for causing at least one processor to perform a method that identifies content within an image, the method comprising:
   receiving a plurality of training set images along with human-judged labels for each training set image;
   generating numerical data for each image of the plurality of training set images;
   creating a matrix using the numerical data and human-judged labels for each training set image, wherein each row of the matrix corresponds to an individual training set image;
   constructing decision trees using the matrix to determine patterns in the matrix;
   receiving an image from a client computer;
   converting the image into numerical data;
   traversing the decision trees using the numerical data from the image until leaf nodes of the decision trees are reached, each leaf node containing a vote identifying the image as inappropriate or appropriate;
   taking a majority rule of the votes and returning an overall response based on the majority rule of the votes to the client computer;
   receiving a new plurality of training set images along with new human-judged labels for each new training set image;
   generating numerical data for each new image of the new plurality of training set images;
   appending new entries to the matrix using the generated numerical data for each new image of the new plurality of training set images; and
   adding new trees, branches, and leaves to the decision trees using the new entries from the matrix to determine new patterns in the matrix.

24. The non-transitory computer readable medium of claim 23, wherein the client computer is a host server.

25. The non-transitory computer readable medium of claim 23, wherein the client computer is an ad server.

26. A system for identifying multiple objects within an image, the system comprising:
   a server coupled to a network, the server comprising:
   at least one processor;
   a database for storing information about a plurality of training set images, wherein the information includes numerical data along with a human-judged label associated with each training set image in a BigMatrix, the BigMatrix used to form a RandomForest for determining patterns within the plurality of training set images;
   a memory operatively coupled to the processor, the memory having program instructions configured to cause the processor to:
      receive an image from the network;
      generate image rasters from the image;
      convert the image rasters into numerical data;
      traverse the RandomForest using the numerical data from the image rasters until leaf nodes of the RandomForest are reached, each leaf node containing a human-judged label and a vote identifying the object within the image raster;
      take a majority rule of the votes for each image raster and returning an overall response for the image rasters based on the majority rule of the votes;
   receive a new plurality of training set images along with new human-judged labels for each new training set image;
   generate numerical data for each new image of the new plurality of training set images;
   append new entries to the matrix using the generated numerical data for each new image of the new plurality of training set images; and
   add new trees, branches, and leaves to the decision trees using the new entries from the matrix to determine new patterns in the matrix.

\* \* \* \* \*